United States Patent
Newell

(10) Patent No.: US 6,632,040 B1
(45) Date of Patent: Oct. 14, 2003

(54) ADHESIVE APPLICATOR BRUSHES FURNISHED IN ADHESIVE CONTAINERS, AND METHOD

(76) Inventor: Robert L. Newell, 36 Passaic Ave., West Paterson, NJ (US) 07424

( * ) Notice: Subject to any disclaimer, the term of this patent is extended or adjusted under 35 U.S.C. 154(b) by 0 days.

(21) Appl. No.: 10/011,653

(22) Filed: Dec. 4, 2001

(51) Int. Cl.[7] .............................................. A46B 11/00
(52) U.S. Cl. ..................... 401/129; 15/207.2; 428/374; 428/378; 428/423.7
(58) Field of Search .................. 401/129; 15/207.2; 428/423.7, 374, 378

(56) References Cited

U.S. PATENT DOCUMENTS

| | | | |
|---|---|---|---|
| 4,072,769 A | 2/1978 | Lidel | |
| 4,508,781 A | 4/1985 | Yagi et al. | |
| 4,917,520 A | * 4/1990 | Reid | ...................... 401/129 X |
| 5,108,667 A | 4/1992 | Kamen et al. | |
| 5,526,546 A | 6/1996 | Kamen | ...................... 15/207.2 |
| 6,099,962 A | * 8/2000 | Sato et al. | .............. 428/378 X |
| 6,120,060 A1 | * 4/2001 | Gueret | ...................... 401/129 |

OTHER PUBLICATIONS

*Plasma Surface Chemistry*, Branson/IPC, a SmithKline Company.

* cited by examiner

*Primary Examiner*—Gregory Huson
*Assistant Examiner*—Kathleen J. Prunner
(74) *Attorney, Agent, or Firm*—Arthur Jacob

(57) ABSTRACT

An applicator brush for use in connection with a moisture-responsive adhesive, such as a cyanoacrylate adhesive, is made with bristles constructed of filaments of a synthetic polymeric material and treated by fluorination to provide a surface barrier against the permeation of the bristles by moisture. The applicator brush is furnished in an adhesive package in which bristles of the brush are in contact with adhesive carried in a reservoir of a container of the package.

12 Claims, 3 Drawing Sheets

ADHESIVE APPLICATOR BRUSHES FURNISHED IN ADHESIVE CONTAINERS, AND METHOD

The present invention relates generally to applicator brushes used in connection with adhesives and pertains, more specifically, to improvements in applicator brushes ordinarily furnished in adhesive containers for applying adhesives of the type formulated to set-up and harden rapidly in response to the presence of moisture.

Adhesives are available commercially which set-up and harden in response to the presence of moisture at the site where the adhesive is applied to surfaces to be bonded. In particular, adhesives comprising cyanoacrylate, known as "CA adhesives", have become quite popular for a wide variety of uses where the ability of such adhesives to harden and form an exceptionally strong bond when applied to many different surfaces encountered in the field is a significant asset. These CA adhesives, usually referred to as super-glues, currently are available commercially from several is sources, some of the more well-known brand names being KRAZY GLUE and LOCKTITE.

A characteristic of CA adhesives is the ability to harden almost immediately when in the presence of moisture. In use, CA adhesives respond to moisture in the ambient air at the site of use to set-up rapidly and quickly form the sought-after strong bond. However, while this characteristic is desirable for most uses of CA adhesives, rapid set-up and hardening in response to the presence of moisture has limited the ability to use commonly available applicator brushes in connection with CA adhesives, resulting in concomitant limitations in versatility in the use of CA adhesives, for the reason that such commonly available applicator brushes utilize bristles which ordinarily tend to carry moisture, and that moisture can cause the adhesive to set-up and harden prematurely. Thus, in the most convenient packaging of adhesives, in which an applicator brush is furnished within a container of adhesive by closing the container with a cap carrying an integral applicator brush, the bristles of the brush are immersed in adhesive carried in the container. The presence of moisture in the bristles will tend to set-up the adhesive, thereby rendering the entire package useless. In addition, once a package is opened and the applicator brush is exposed to ambient air, any moisture absorbed by the bristles of the brush and carried back to the adhesive in the container can cause unwanted hardening of the adhesive, again rendering the entire package useless. Further, any moisture carried by the bristles of an applicator brush during application of a CA adhesive at a selected site will tend to set-up and harden it the adhesive prematurely, thereby limiting the ability of the brush to distribute the adhesive evenly over the surfaces to be bonded. Thus, applicator brushes constructed with the most commonly used natural bristles, such as horse hair, goat hair, squirrel hair, and hog bristle, tend to carry moisture and are not well-suited for use in connection with CA adhesives. Likewise, nylon, which is the synthetic fiber used most commonly in applicator brushes, tends to absorb moisture and is undesirable for use with CA adhesives.

The present invention provides an improvement which enables applicator brushes having bristles constructed of synthetic polymeric fibers to resist moisture absorption and to allow use in connection with CA adhesives, as well as other moisture-responsive adhesives, without significant unwanted or premature set-up and hardening of the adhesive. As such, the present invention attains several objects and advantages, some of which are summarized as follows: Provides applicator brushes improved for use in connection with moisture-responsive adhesives without significant unwanted or premature set-up and hardening of the adhesive; resists exposure of a moisture-responsive adhesive to moisture which could cause unwanted or premature set-up and hardening of the adhesive, either during storage of the adhesive in a container or during application of the adhesive to a selected surface at the site of use; enables the use of commercially available, relatively economical synthetic polymeric fibers as bristles in applicator is brushes employed in connection with moisture-responsive adhesives, such as CA adhesives; extends the useful life of packaged moisture-responsive adhesives, such as CA adhesives, by resisting the introduction of unwanted moisture into such packages; facilitates the use of applicator brushes in applying CA adhesives and similar moisture-responsive adhesives evenly upon surfaces to be bonded; enables economical packaging of applicator brushes with CA adhesives, as well as with other moisture-responsive adhesives, for more convenient and effective distribution and use of such adhesives; promotes widespread and more versatile use of moisture-responsive adhesives, such as CA adhesives, with increased ease and reduced waste.

The above objects and advantages, as well as further objects and advantages, are attained by the present invention which may be described briefly as providing, in an applicator brush for use in connection with a moisture-responsive adhesive, the applicator brush having bristles with external surfaces for contacting the adhesive, an improvement wherein the bristles are constructed of filaments of a synthetic polymeric material treated by fluorination to establish a surface barrier along the external surfaces of the bristles for rendering the external surfaces resistant to permeation by moisture.

In addition, the present invention provides, in a method for making an applicator brush for use in connection with a moisture-responsive adhesive, the applicator brush having bristles with external surfaces for contacting the adhesive, an improvement comprising the steps of: constructing the bristles of filaments of a synthetic polymeric material; and treating the material of the bristles by fluorination to establish a surface barrier along the external surfaces of the bristles for rendering the external surfaces resistant to permeation by moisture.

Further, the present invention provides, in an adhesive package for use in connection with a moisture-responsive adhesive, the adhesive package including a container for the adhesive and an applicator brush for extending into the container to be in contact with the adhesive in the container, the applicator brush having bristles with external surfaces for contacting the adhesive, an improvement wherein the bristles are constructed of filaments of a synthetic polymeric material treated by fluorination to establish a surface barrier along the external surfaces of the bristles for rendering the external surfaces resistant to permeation by moisture.

The invention will be understood more fully, while still further objects and advantages will become apparent, in the following detailed description of preferred embodiments of the invention illustrated in the accompanying drawing, in which.

Figure 1:
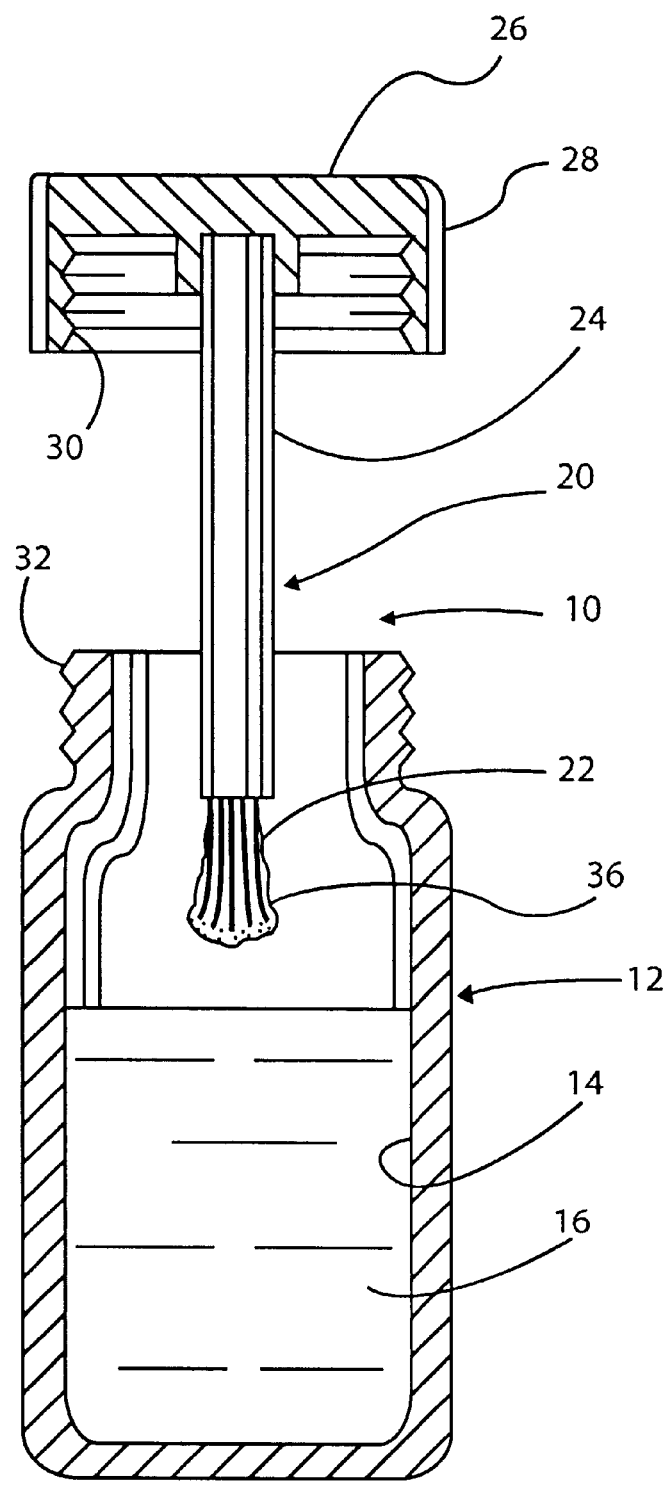
FIG. 1 is an exploded longitudinal cross-sectional view illustrating an applicator brush constructed in accordance with the present improvement for use in connection with a container in a package improved by the present invention.

Referring now to the drawing, and especially to FIG. 1 thereof, a package utilizing the improvement of the present invention is illustrated at 10 and is seen to include a container in the form of a vial 12 having a reservoir 14 for containing a moisture-responsive adhesive, shown in the form of CA adhesive 16. An applicator brush 20 incorporates an improvement of the present invention and is seen to include bristles 22 affixed to a stem 24 which is integral with and depends from a cap 26. Cap 26 includes a knurled rim 28 for facilitating manipulation of the applicator brush 20, and an internal threaded element 30 is to be engaged with a complementary external threaded element 32 on the vial 12 to close the container and complete the package 10.

Figure 2:
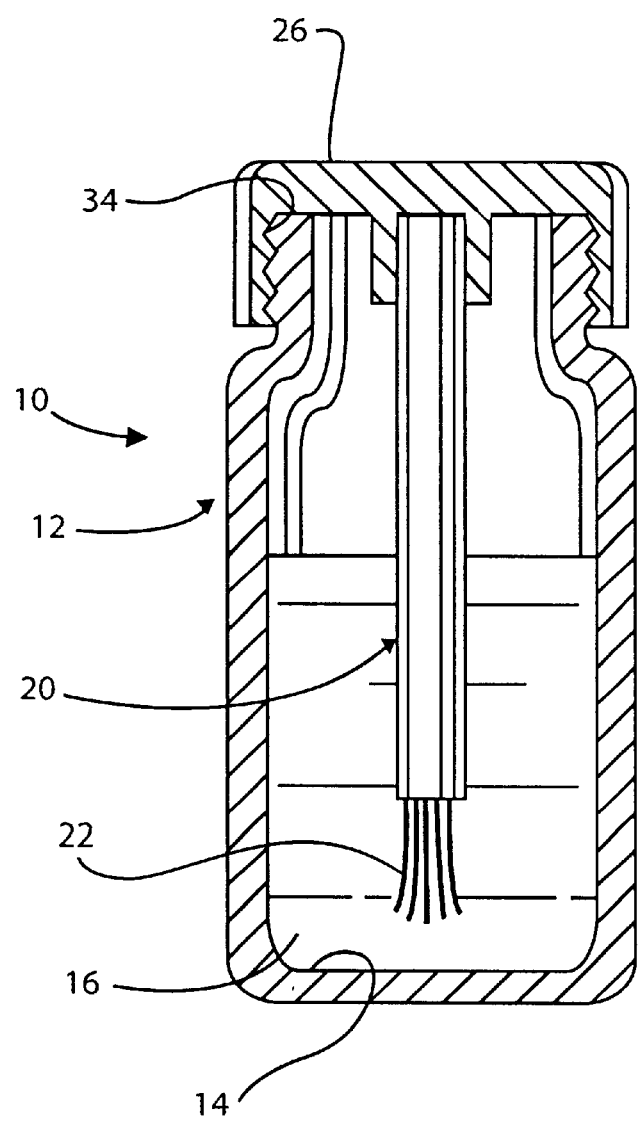
FIG. 2 is a longitudinal cross-sectional view similar to FIG. 1 and showing the applicator brush assembled with the container in a package provided with an improvement of the present invention.

As seen in FIG. 2, the cap 26 is threaded onto the vial 12 and engages the vial 12 at a seat 34 to seal the closed package 10. In the sealed condition shown, the bristles 22 of the brush 20 are in contact with the adhesive 16 by being immersed in the adhesive 16. Upon disengagement of the cap 26 from the vial 12, as seen in FIG. 1, the bristles 22 of brush 20 carry a charge 36 of adhesive 16 which is in contact with the bristles 22 and which is transferred by the brush 20 to a selected site for application to a surface to be bonded, with the cap 26 serving as a manipulating handle, in a now well-known conventional manner.

As described above, conventional applicator brushes utilize bristles constructed of either natural fibers or synthetic fibers which tend to absorb moisture and, as such, can cause unwanted or premature set-up and hardening of a CA adhesive, or another moisture-responsive adhesive. Thus, any moisture carried by the bristles 22 of brush 20 into contact with the adhesive 16 in reservoir 14 can result in the set-up and hardening of adhesive 16 while in the vial 12, rendering the adhesive 16 useless. Likewise, any moisture carried by the bristles 22 of brush 20 during use of the brush 20 in the application of a charge of adhesive 16 to a surface at a selected site for bonding can cause premature set-up and hardening of the charge 36 of adhesive 16, with deleterious consequences, such as interference with the smooth and even distribution of adhesive 16 upon the surface to be bonded.

In order to preclude the carrying of unwanted moisture to adhesive 16 by bristles 22, the bristles 22 are constructed of a synthetic polymeric fiber treated to deter the absorption of moisture by the bristles 22. I have found that by treating certain synthetic polymeric fibers by fluorination, a surface barrier is established along the external surface of the fiber which reduces the permeability of the surface to moisture and resists the absorption of moisture by the fiber. The fluorination process itself is known in the treatment of bottles, drums, plastic spill pallets, tanks, bulk containers and molded and fabricated plastic parts, one such process being offered commercially under the mark at FLUORO-SEAL by Fluoro-Seal, Inc. in Houston, Tex. I have found that fluorination of synthetic polymeric fibers of polyethylene, polypropylene and polyester, preferably having a diameter in the range of about 0.002 inch to about 0.022 inch, provides a fiber having mechanical characteristics suitable for use as bristles in an applicator brush for adhesives, with the added ability to resist absorption of moisture so as to enable use in connection with a moisture-responsive adhesive, such as a CA adhesive, as described above.

Figure 3:
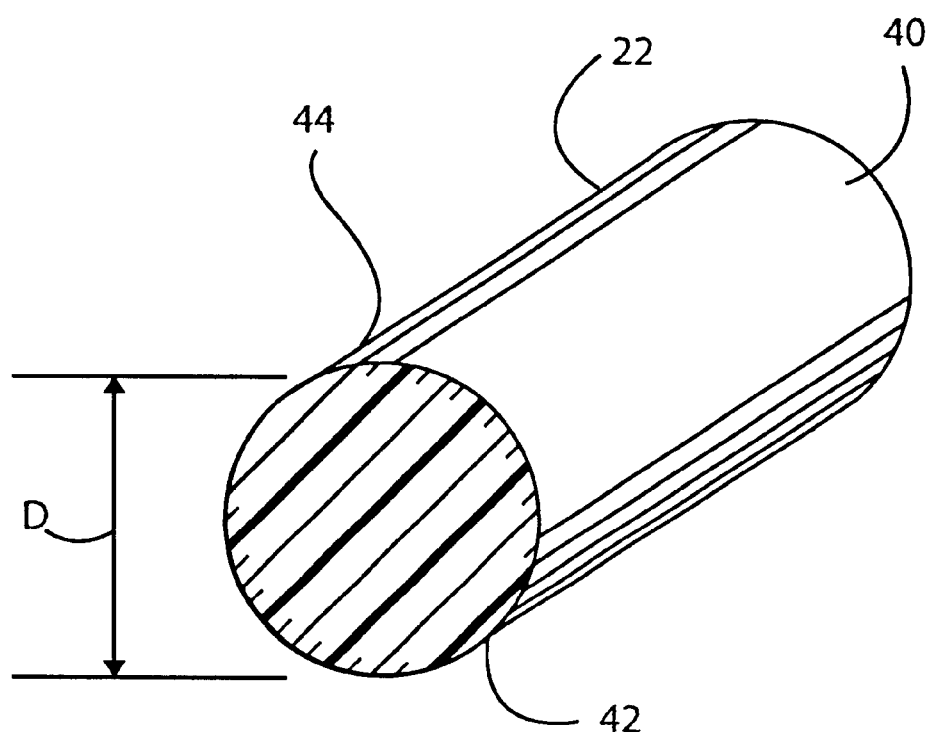
FIG. 3 is an enlarged fragmentary pictorial view of a bristle of the applicator brush.

As illustrated in FIG. 3, bristle 22 is constructed of a fiber 40 of synthetic polymeric material selected from the group consisting of polyethylene, polypropylene and polyester and has a diameter D, preferably in the range of about 0.002 inch to about 0.022 inch, and an external surface 42. Bristle 22 has been treated by fluorination, as set forth above, to establish a surface barrier 44 along the external surface 42 and thereby render the bristle 22 resistant to permeation by moisture. In this manner, the introduction of unwanted moisture into the adhesive 16 in the reservoir 14 of vial 12 is deterred, thereby precluding unwanted set-up and hardening of the adhesive 16 within the vial 12, which otherwise could occur upon inserting an applicator brush into a vial of adhesive. Further, by precluding the absorption of moisture by bristles 22, premature set-up and hardening of adhesive 16 is precluded during use of the applicator brush 20 at a selected site, facilitating the even application and distribution of adhesive 16 along a surface to be bonded.

It will be seen that the present invention provides an improvement which attains all of the objects and advantages summarized above, namely: Provides applicator brushes improved for use in connection with moisture-responsive adhesives without significant unwanted or premature set-up and hardening of the adhesive; resists exposure of a moisture-responsive adhesive to moisture which could cause unwanted or premature set-up and hardening of the adhesive, either during storage of the adhesive in a container or during application of the adhesive to a selected surface at the site of use; enables the use of commercially available, relatively economical synthetic polymeric fibers as bristles in applicator brushes employed in connection with moisture-responsive adhesives, such as CA adhesives; extends the useful life of packaged moisture-responsive adhesives, such as CA adhesives, by resisting the introduction of unwanted moisture into such packages; facilitates the use of applicator brushes in applying CA adhesives and similar moisture-responsive adhesives evenly upon surfaces to be bonded; enables economical packaging of applicator brushes with CA adhesives, as well as with other moisture-responsive adhesives, for more convenient and effective distribution and use of such adhesives; promotes widespread and more versatile use of moisture-responsive adhesives, such as CA adhesives, with increased ease and reduced waste.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. In an applicator brush for use in connection with a moisture-responsive adhesive, the applicator brush having bristles with external surfaces for contacting the adhesive, an improvement wherein the bristles are constructed of filaments of a synthetic polymeric material treated by fluorination to establish a surface barrier along the external surfaces of the bristles for rendering the external surfaces resistant to permeation by moisture.

2. The improvement of claim 1 wherein the filaments have a diameter in the range of about 0.002 inch to about 0.022 inch.

3. The improvement of claim 1 wherein the synthetic polymeric material is selected from the group consisting of polyethylene, polypropylene and polyester.

4. The improvement of claim 3 wherein the filaments have a diameter in the range of about 0.002 inch to about 0.022 inch.

5. In a method for making an applicator brush for use in connection with a moisture-responsive adhesive, the applicator brush having bristles with external surfaces for contacting the adhesive, an improvement comprising the steps of:

constructing the bristles of filaments of a synthetic polymeric material; and treating the material of the bristles by fluorination to establish a surface barrier along the external surfaces of the bristles for rendering the external surfaces resistant to permeation by moisture.

6. The improvement of claim 5 wherein the filaments have a diameter in the range of about 0.002 inch to about 0.022 inch.

7. The improvement of claim 5 wherein the synthetic polymeric material is selected from the group consisting of polyethylene, polypropylene and polyester.

8. The improvement of claim 7 wherein the filaments have a diameter in the range of about 0.002 inch to about 0.022 inch.

9. In an adhesive package for use in connection with a moisture-responsive adhesive, the adhesive package including a container for the adhesive and an applicator brush for extending into the container to be in contact with the adhesive in the container, the applicator brush having bristles with external surfaces for contacting the adhesive, an improvement wherein the bristles are constructed of filaments of a synthetic polymeric material treated by fluorination to establish a surface barrier along the external surfaces of the bristles for rendering the external surfaces resistant to permeation by moisture.

10. The improvement of claim 9 wherein the filaments have a diameter in the range of about 0.002 inch to about 0.022 inch.

11. The improvement of claim 9 wherein the synthetic polymeric material is selected from the group consisting of polyethylene, polypropylene and polyester.

12. The improvement of claim 11 wherein the filaments have a diameter in the range of about 0.002 inch to about 0.022 inch.

\* \* \* \* \*